United States Patent
Hara

(10) Patent No.: US 12,186,624 B2
(45) Date of Patent: Jan. 7, 2025

(54) REHABILITATION SUPPORT APPARATUS AND REHABILITATION SUPPORTING METHOD

(71) Applicant: mediVR, Inc., Osaka (JP)

(72) Inventor: Masahiko Hara, Osaka (JP)

(73) Assignee: MEDIVR, INC., Osaka (JP)

( * ) Notice: Subject to any disclaimer, the term of this patent is extended or adjusted under 35 U.S.C. 154(b) by 227 days.

(21) Appl. No.: 17/044,164

(22) PCT Filed: May 20, 2020

(86) PCT No.: PCT/JP2020/019919
§ 371 (c)(1),
(2) Date: Sep. 30, 2020

(87) PCT Pub. No.: WO2021/019874
PCT Pub. Date: Feb. 4, 2021

(65) Prior Publication Data
US 2021/0362004 A1 Nov. 25, 2021

(30) Foreign Application Priority Data

Jul. 31, 2019 (JP) ................................ 2019-141766

(51) Int. Cl.
*G06F 3/01* (2006.01)
*A63B 24/00* (2006.01)

(52) U.S. Cl.
CPC ...... *A63B 24/0003* (2013.01); *A63B 24/0087* (2013.01); *G06F 3/011* (2013.01); *G06F 3/016* (2013.01); *A63B 2024/0096* (2013.01)

(58) Field of Classification Search
CPC ..... G06F 3/011; G06F 3/016; A63B 24/0003; A63B 24/0087; A63B 2024/0096
See application file for complete search history.

(56) References Cited

U.S. PATENT DOCUMENTS

| 5,407,357 A | 4/1995 | Cutler |
| 7,886,236 B2 | 2/2011 | Kolmykov-Zotov et al. |
| 10,065,074 B1* | 9/2018 | Hoang ................. G09B 19/003 |

(Continued)

FOREIGN PATENT DOCUMENTS

| CN | 1291755 A | 4/2001 |
| CN | 1534441 A | 10/2004 |

(Continued)

OTHER PUBLICATIONS

Japanese Office Action with an English translation dated Oct. 24, 2019 for Application No. JP 2019-141768.

(Continued)

*Primary Examiner* — Jay Trent Liddle
*Assistant Examiner* — Alyssa N Brandley
(74) *Attorney, Agent, or Firm* — DiPerna Law Firm, P.C.

(57) ABSTRACT

To more effectively improve mobility impairment of a user by supporting rehabilitation, this invention provides a rehabilitation support apparatus for supporting rehabilitation of a user with mobility impairment, including a requester that requests a target action in a three-dimensional virtual space, and a feedback unit that performs feedback that stimulates at least two of five senses to the user who has performed the target action almost at the same time as a timing of performing the target action.

20 Claims, 3 Drawing Sheets

(56) References Cited

U.S. PATENT DOCUMENTS

| | | | |
|---|---|---|---|
| 2011/0112441 A1* | 5/2011 | Burdea | A63B 24/0021 600/595 |
| 2012/0157263 A1* | 6/2012 | Sivak | G16H 40/63 482/4 |
| 2017/0098385 A1* | 4/2017 | Martucci | G16H 30/40 |
| 2017/0143229 A1 | 5/2017 | Weffers-Albu et al. | |
| 2017/0196482 A1 | 7/2017 | Matsumoto et al. | |
| 2017/0364143 A1 | 12/2017 | Danieau et al. | |
| 2018/0121728 A1* | 5/2018 | Wells | G06T 19/006 |
| 2018/0151258 A1* | 5/2018 | Sánchez Vives | G06F 3/016 |
| 2018/0237284 A1 | 8/2018 | Burdea et al. | |
| 2018/0292888 A1* | 10/2018 | Slepian | A61B 5/4836 |
| 2018/0317837 A1* | 11/2018 | Burwinkel | H04R 5/033 |
| 2018/0336973 A1* | 11/2018 | Tadi | G06T 19/003 |
| 2019/0088152 A1* | 3/2019 | Adamovich | A61B 5/1128 |
| 2019/0209891 A1* | 7/2019 | Fung | G06F 3/0338 |

FOREIGN PATENT DOCUMENTS

| | | |
|---|---|---|
| CN | 201453284 U | 5/2010 |
| CN | 106413532 A | 2/2017 |
| CN | 107111367 A | 8/2017 |
| CN | 107224273 A | 10/2017 |
| CN | 107833611 A | 3/2018 |
| CN | 109077895 A | 12/2018 |
| CN | 109219426 A | 1/2019 |
| CN | 109419604 A | 3/2019 |
| EP | 3153146 A1 | 4/2017 |
| EP | 3539525 A1 | 9/2019 |
| JP | H06167925 A | 6/1994 |
| JP | H11219100 A | 8/1999 |
| JP | 2003305094 A | 10/2003 |
| JP | 2010075387 A | 4/2010 |
| JP | 2010287221 A | 12/2010 |
| JP | 2011110215 A | 6/2011 |
| JP | 2011182841 A | 9/2011 |
| JP | 2014223210 A | 12/2014 |
| JP | 2015066292 A | 4/2015 |
| JP | 6200615 B1 | 9/2017 |
| JP | 2018-094026 A | 6/2018 |
| JP | 2018-185501 A | 11/2018 |
| JP | 2019-076703 A | 5/2019 |
| JP | 6531338 B1 | 5/2019 |
| JP | 2019076290 A | 5/2019 |
| KR | 20170135459 A | 12/2017 |
| WO | 2005074371 A2 | 8/2005 |
| WO | WO-2015186586 A1 * | 12/2015 ... A61B 5/11 |
| WO | 2018154042 A1 | 8/2018 |
| WO | 2018199196 A1 | 11/2018 |

OTHER PUBLICATIONS

International Search Report (ISR) and Written Opinion (WO) dated Aug. 4, 2020 for pplication No. PCT/JP2020/019919.
J-PlatPat English abstract of JP 6631338 B1.
Espacenet English abstract of JP 2003305094 A.
Espacenet English abstract of JP 2015066292 A.
Espacenet English abstract of JP H06167925 A.
Espacenet English abstract of JP 2014223210 A.
Espacenet English abstract of JP 2019076290 A.
Espacenet English abstract of JP 2011110215 A.
Espacenet English abstract of JP 2011182841 A.
Espacenet English abstract of JP 2010075387 A.
J. Marsden et al., Rehabilitation in practice "Cerebellar ataxia: pathophysiology and rehabilitation", Clinical Rehabilitation 2011, vol. 25, pp. 195-216.
AHA/AGA Guideline, Carol J. Winstein, et al., "Guidelines for Adult Stroke Rehabilitation and Recovery", Stroke 2016, American Heart Association, Inc. pp. e98-e169 (72 pages).
Extended European Search Report dated May 17, 2021 for Application No. EP 20780551.6.
Espacenet English abstract of WO 2018199196 A1.
Korean Patent Abstracts English abstract of KR 20170135459 A.
The First Chinese Office Action dated Sep. 27, 2022 for Chinese Patent Application No. CN 202080002739.X, with an English machine translation thereof, 15 pages.
Notice of Reasons for Refusal (Office Action) dated May 30, 2023, in Japanese Patent Application No. 2020-089364, with an English machine translation thereof, 8 pages.
An Office Action issued on Nov. 13, 2023 in connection with European Patent Application No. 20780551.6.
A Decision of Refusal issued on Aug. 10, 2023 in Chinese Patent Application No. 202080002739.X.
First Office Action issued on Aug. 27, 2024 in corresponding Japanese Patent Application No. 2023-191148, with English translation, 8 pages.

* cited by examiner

REHABILITATION SUPPORT APPARATUS AND REHABILITATION SUPPORTING METHOD

RELATED APPLICATION

This application is an application under 35 U.S.C. 371 of International Application No. PCT/JP2020/019919 filed on May 20, 2020, the entire contents of which are incorporated herein by reference.

This application claims the benefit of Japanese Patent Application No. 2019-141766 filed on Jul. 31, 2019, which is hereby incorporated by reference herein in its entirety.

TECHNICAL FIELD

The present invention relates to a rehabilitation support apparatus and a rehabilitation supporting method.

BACKGROUND ART

In the above technical field, non-patent literature 1 discloses rehabilitation for a patient of cerebellar ataxia. In particular, according to the first sentence of Implications for rehabilitation approaches on p. 202, there do not exist studies established to some extent concerning treatments in this field. It is described that two approaches, that is, a "repairing" approach and a "function supporting" approach are mainly used.

Non-patent literature 2 is a guideline of AHA concerning treatments of cerebral infarction/intracerebral bleeding (stroke). The left column of e122 has a description about "Limb Apraxia", that is, apraxia=a state (mobility impairment) in which a patient cannot move the body as wished. The description is "there is a paucity of research on therapeutic interventions for limb apraxia." It is written that research to improve mobility impairment is not progressing.

CITATION LIST

Non-Patent Literature

Non-patent literature 1: Rehabilitation in practice "Cerebellar ataxia: pathophysiology and rehabilitation" Clinical Rehabilitation 2011; 25: 195-216

Non-patent literature 2: AHA/AGA Guideline "Guidelines for Adult Stroke Rehabilitation and Recovery"

SUMMARY OF THE INVENTION

Technical Problem

That is, by the technique described in the above literatures, it is impossible to effectively improve mobility impairment.

The present invention enables to provide a technique of solving the above-described problem.

Solution to Problem

One example aspect of the present invention provides a rehabilitation support apparatus for supporting rehabilitation of a user with mobility impairment, comprising a requester that requests a target action in a three-dimensional virtual space displayed on a display unit, and a feedback unit that performs feedback that stimulates at least two of five senses to the user who has performed the target action in synchronism with evaluation of achievement of the target action of each time substantially at the same time as a timing of performing the target action.

Another example aspect of the present invention provides a rehabilitation supporting method for supporting rehabilitation of a user with mobility impairment, comprising requesting a target action in a three-dimensional virtual space displayed on a display unit, and performing feedback that stimulates at least two of five senses to a user who has performed the target action in synchronism with evaluation of achievement of the target action of each time substantially at the same time as a timing of performing the target action.

Advantageous Effects of Invention

According to the present invention, it is possible to effectively improve mobility impairment.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A rehabilitation support apparatus 100 according to the first example embodiment of the present invention will be described with reference to FIG. 1. The rehabilitation supporting apparatus 100 is an apparatus that supports rehabilitation of a user 110 having mobility impairment.

Figure 1:
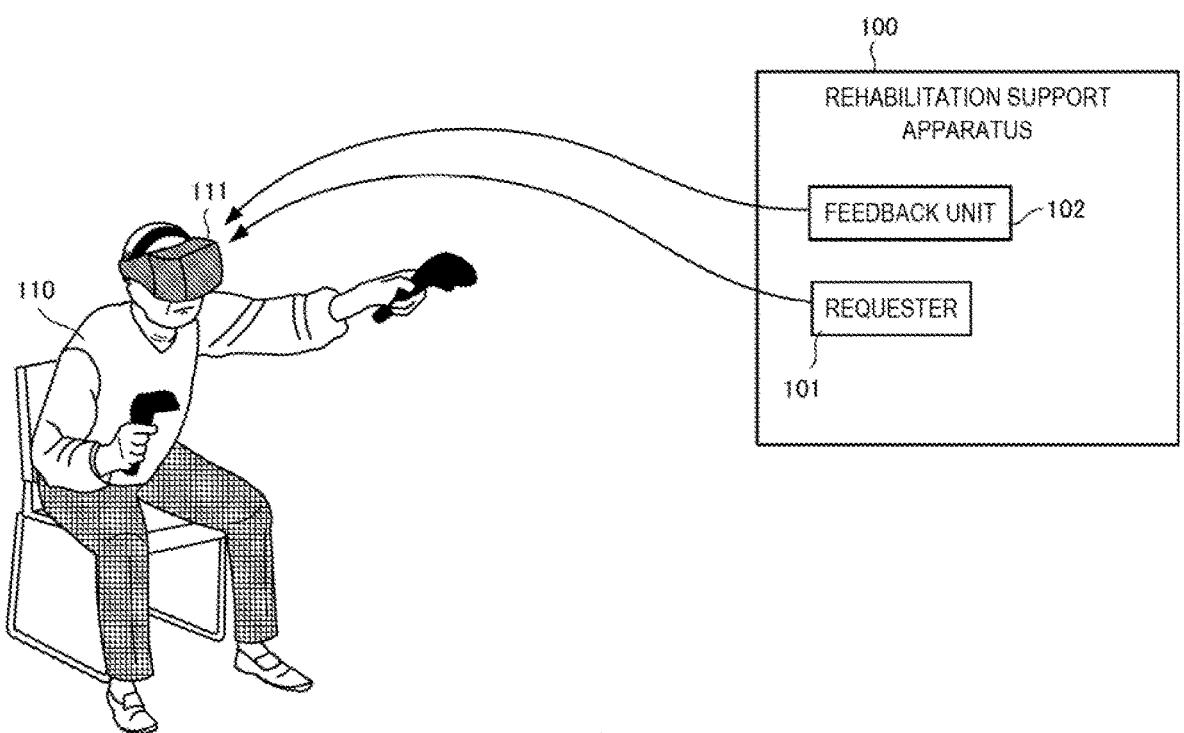
FIG. 1 is a block diagram showing the arrangement of a rehabilitation support apparatus according to the first example embodiment of the present invention.

As shown in FIG. 1, the rehabilitation support apparatus 100 includes a requester 101 and a feedback unit 102. The requester 101 requests a target action (for example, an action of virtually touching a target object displayed on a display unit 111) in a three-dimensional virtual space displayed on the display unit 111.

For the user who has virtually touched the target object, the feedback unit 102 performs feedback for stimulating two or more of five senses almost at the same time as the timing of a touch on the target object.

As described above, when multiple feedback (multi-channel feedback) is performed, mobility impairment can effectively be improved. Additionally, when a motion model is reconstructed in the brain of the user by the multi-channel feedback, pain symptoms including phantom limb pain are improved.

Second Example Embodiment

Figure 2:
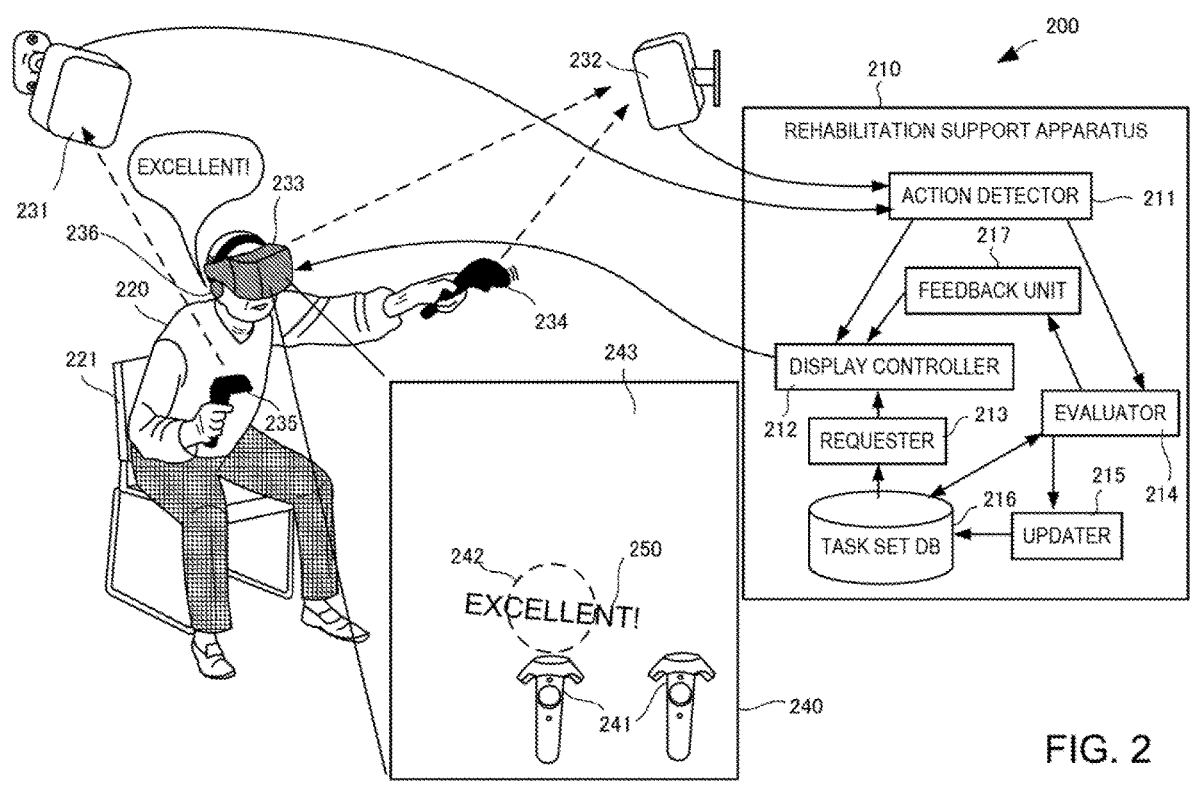
FIG. 2 is a block diagram showing the arrangement of a rehabilitation supporting system according to the second example embodiment of the present invention.

A rehabilitation supporting system 200 according to the second example embodiment of the present invention will be described with reference to FIG. 2. FIG. 2 is a view for explaining the arrangement of a rehabilitation supporting system 200 according to this example embodiment.

As shown in FIG. 2, the rehabilitation supporting system 200 includes a rehabilitation support apparatus 210, two base stations 231 and 232, a head mounted display 233, and two controllers 234 and 235. A user 220 sitting on a chair 221 inclines or twists the upper half body or stretches the hands in various directions in accordance with display on the head mounted display 233, thereby making a rehabilitation action. In this example embodiment, a description will be made assuming rehabilitation performed mainly using upper limbs while sitting on a chair. However, the present invention is not limited to this. For example, rehabilitation may be performed on a bed or performed in a standing position. An action using lower limbs, body trunk, fingers, head, or face may be performed by attaching sensors to portion other than the hands. When VR is used, even a patient who cannot sit can perform maximum rehabilitation on a bed.

The two base stations 231 and 232 sense the motion of the head mounted display 233 and the motions of the controllers 234 and 235, and send these to the rehabilitation support apparatus 210. The rehabilitation support apparatus 210 performs display control of the head mounted display 233 while evaluating the rehabilitation action of the user 220. The head mounted display 233 can be of a non-transmissive type, a video see-through type, or optical see-through type. Also, as a video display means, monitors may be arranged around or partially around, or a stereoscopic video technique such as a hologram or an alternative means may be used. That is, any means of Virtual Reality, Augmented Reality, Mixed Reality, and the like may be used, and additionally, the system may be formed using actually existing objects without using a video. A headphone speaker 236 is attached to the head mounted display 233, and the rehabilitation support apparatus 210 outputs, from the headphone speaker 236, a voice according to the evaluation result of the rehabilitation action of the user 220. Note that the voice output means is not limited to the headphone, and a bone conduction earphone or an external acoustic device may be used.

In this example embodiment, as an example of a sensor configured to detect the action of the user 220, the controllers 234 and 235 held in the hands of the user 220 and the base stations 231 and 232 have been described. However, the present invention is not limited to this. A camera (including a depth sensor) configured to detect the positions of the hands of the user by image processing, a sensor configured to detect the positions of the hands of the user by a temperature, a wristwatch-type wearable terminal put on an arm of the user, a motion capture device, a gyro sensor incorporated in each of various kinds of devices, or the like may be included in the action detector.

The rehabilitation support apparatus 210 includes an action detector 211, a display controller 212, a requester 213, an evaluator 214, an updater 215, a task set database 216, and a feedback unit 217.

The action detector 211 acquires, via the base stations 231 and 232, the positions of the controllers 234 and 235 held in the hands of the user 220, and detects the rehabilitation action of the user 220 based on changes in the positions of the left and right hands of the user 220.

The display controller 212 generates, in a virtual space, avatar objects 241 that move in accordance with a detected rehabilitation action and a target object 242 representing the target of the rehabilitation action. The display controller 212 displays, on a display screen 240, the images of the avatar objects 241 and the target object 242 in accordance with the direction and position of the head mounted display 233 detected by the action detector 211. The images of the avatar objects 241 and the target object 242 are superimposed on a background image 243. Here, the avatar objects 241 have the same shape as the controllers 234 and 235. However, the shape is not limited to this. The avatar objects 241 move in the display screen 240 in accordance with the motions of the controllers 234 and 235. As displayed on the avatar objects 241, buttons are prepared on the controllers 234 and 235, and the controllers 234 and 235 are configured to perform various kinds of setting operations.

The display controller 212 displays the target object 242 in the display screen 240. The display controller 212 moves the target object 242 in the display screen 240 while gradually changing its display position and size. For example, the display controller 212 moves and displays the target object 242 such that it falls downward from above the user 220, or moves and displays the target object 242 such that it approaches the user 220. Note that an example in which the target object 242 moves has been described here. However, the present invention is not limited to this, and the target object 242 at rest may be displayed.

The user 220 moves the controllers 234 and 235 to make the avatar objects 241 in the screen approach to the target object 242. If the avatar objects 241 hit the target object 242, the display controller 212 makes the target object 242 disappear, and the feedback unit 217 determines that a target action has been achieved, and displays a message 250. To more severely evaluate, the rehabilitation action may be evaluated based on how close the distance between the target object 242 and a sensor object included in each avatar object 241 (for example, the center of the avatar object 241) has become, instead of fixing the target action to a single target object, a plurality of target objects may be prepared, or, for example, a locus such as how to move a hand or how to move a lower limb in walking may be set as the target action.

The feedback unit 217 preferably changes the message 250 in accordance with the evaluation of the rehabilitation action via the display controller 212. For example, if the sensor object contacts the center of the target object 242, "excellent" is displayed. If the sensor object contacts only the peripheral portion of the center of the target object 242, "well done" is displayed.

The task set database 216 stores a plurality of task sets. A task represents one rehabilitation action that the user should make. More specifically, the task set database 216 stores, as information representing one task, information representing the size, position, and speed of a target object that was made to appear and the size of the avatar object at that time.

More specifically, the contents of a task include the sizes of the left and right target objects 242, the sizes of the avatar objects 241 (sensor objects), the falling (action) speed of the target object 242, the position of the target object, and the like. More specifically, on each of the right and left sides, the radius (visual recognition size) of a visual recognition object that makes the target object position easy to see, and the radius (evaluation size) of a target object that reacts with the avatar object 241 can also be set as the contents of a task. That is, a ball with a radius of 20 cm is shown to the user, and evaluation "excellent" is given only when he/she has touched a ball with a radius of 10 cm located at the center of the ball. If the visual recognition size is small, it is difficult for the user to find the target object. If the visual recognition size is large, the user can easily find the target object. If the evaluation size is large, the allowable amount of the deviation of the avatar object 241 is large, and the tolerance to the position deviation rises. If the evaluation size is small, the allowable amount of the deviation of the avatar object 241 is small, and a rehabilitation action can be evaluated more severely. The visual recognition sizes and the evaluation sizes may be made to match.

The sensor size of the avatar object 241 (the size of the sensor object) may separately be set on the left and right sides. If the sensor size is large, a task is achieved even if the position of a hand largely deviates from the target object. Hence, the difficulty of the rehabilitation action is low. Conversely, if the sensor size is small, it is necessary to correctly move the hand to the center region of the target object (depending on the evaluation size). Hence, the difficulty of the rehabilitation action is high.

If there is a difference in physical capability between the left and right sides in a case of, for example, mobility impairment caused by the sequelae of cerebral infarction, the sensor size of the avatar object is changed between the left and right sides, thereby performing more effective rehabilitation.

The task set database 216 stores task sets each of which determines the order to provide the plurality of tasks to the user. For example, the task sets may be stored as templates for each hospital, or a history of executed task sets may be stored for each user. The rehabilitation support apparatus 210 may be configured to be communicable with another rehabilitation support apparatus via the Internet. In this case, one task set may be executed by the same user in a plurality of places, or various templates may be shared by a plurality of users in remote sites.

The requester 213 requests, via the display controller 212, an action of virtually touching the target object 242 displayed on the display screen 240 in accordance with a task set read out from the task set database 216. Here, instead of fixing the target object to a single target object, a plurality of target objects may be prepared, or, for example, a locus such as how to move a hand or how to move a lower limb in walking may be set as the target action. In addition, not a virtual object but an actually existing object may be prepared as the target object.

For the user who has virtually touched the target object 242, the feedback unit 217 performs feedback for stimulating two or more of five senses almost at the same time as the timing of a touch on the target object 242. For example, within 1 sec, the effect is large. The closer the interval between the action timing of the user and the timing of feedback is (the smaller the delay is), the larger the effect is.

Here, the feedback unit 217 performs feedback of stimulating the visual sense of the user by an image "Excellent!", and simultaneously performs feedback of stimulating the auditory sense of the user by a voice output from the headphone speaker 236.

Also, the feedback unit 217 may simultaneously output feedback of stimulating the visual sense of the user 220 by an image "Excellent!", feedback of stimulating the auditory sense of the user 220 by a voice output from the headphone speaker 236, and feedback of stimulating the tactile sense of the user 220 by vibrating the controller 234.

The feedback unit 217 may simultaneously output only two types of feedback, that is, feedback of stimulating the visual sense of the user 220 by an image "Excellent!", and feedback of stimulating the tactile sense of the user 220 by vibrating the controller 234.

Alternatively, the feedback unit 217 may simultaneously output only two types of feedback, that is, feedback of stimulating the auditory sense of the user 220 by a voice "Excellent!", and feedback of stimulating the tactile sense of the user 220 by vibrating the controller 234.

As described above, feedback of stimulating two or more of five senses is returned almost at the same time as the rehabilitation action of the user, thereby innovatively recovering mobility impairment of the user. That is, such a feedback method is very effective in correcting body control of the user. It is possible to obtain a remarkable effect that cannot be achieved at all by conventional feedback that is orally made by, for example, a therapist with a large delay from a target action achievement timing or single sense feedback. In the conventional feedback with a large delay, it is difficult for the user to feel the achievement of the rehabilitation action, and a motion model cannot be reconstructed in the brain. A disorder in a motion system can dramatically be improved by implementing almost real-time feedback with a small delay using two or more sense stimulations. That is, it is possible to improve the mobility impairment of the user, which cannot be improved by an existing approach. In addition, when three or more input sense stimulations are used, a motion model reconstructed in the brain can be held for a long time.

The evaluator 214 compares the rehabilitation action detected by the action detector 211 and a target position represented by the target object displayed by the display controller 212, and evaluates the rehabilitation capability of the user 220. More specifically, the evaluation is done by comparing the positions in the three-dimensional virtual space concerning the target object 242 and the avatar objects 241 that move in correspondence with the rehabilitation action detected by the action detector 211.

If these match, it is evaluated that the task is completely cleared, and points are fully added. If the positions do not match but are located within a predetermined distance, it is evaluated that the task is cleared to some extent, and points are partially added. These evaluations by the evaluator 214 are done in synchronism with the real-time multi-channel feedback of the feedback unit 217. Hence, the types and strengths of input stimulations of the real-time multi-channel feedback may appropriately be adjusted in accordance with the type of the target action or the degree of achievement. For example, in a case of visual stimulation, stimulation patterns such as the size, color, and luminous intensity of characters or a displayed object, the stimulation time of visual stimulation, and a predetermined interval to make a plurality of times of stimulation and whether to simultaneously make visual stimulation using each or both of the left and right eyes may be changed depending on the type and the degree of achievement of a target action. In a case of auditory stimulation, stimulation patterns such as the type and volume of a sound, a sound transmission means, the stimulation time of auditory stimulation, and stimulation made in a specific rhythm, and whether to simultaneously make auditory stimulation from each or both of the left and right ears may be changed depending on the type and the degree of achievement of a target action. In a case of tactile stimulation, tactile stimulation patterns such as a vibration pattern and the duration of vibration stimulation, a vibration or a pain, the strength of temperature perceptual stimulation such as cool or hot, a tactile stimulation part, and whether to stimulate a plurality of parts may be changed depending on the type and the degree of achievement of a target action. For example, if the target action can be achieved only partially, characters may be made small, the sound may be made small, or tactile vibration stimulation may be weakened. Alternatively, only one of them may be made weak or strong to feed the degree of achievement back. As for how to put strength on stimulation, a reverse pattern may be used in which, for example, tactile stimulation is strengthen, but auditory stimulation is weakened. Additionally, in feedback concerning, for example, a walking action by lower limbs or the like, vibration stimulation on a specific part such as lower limbs may be strengthened. In feedback concerning an upper limb action, visual stimulation may be strengthened. In feedback of a finger (toe) action, the musical scale of auditory stimulation may be adjusted depending on which finger (toe) on the left or right side has achieved the action. In feedback concerning an action of a body trunk, a stimulation part may be changed depending on the direction in which the posture is changed, and, for example, if the posture is changed to the front side, tactile stimulation is given to the belly side of the body trunk. In feedback concerning an action of a face, for example, if a target action of a mouth is designated, and the action can be achieved, auditory stimulation is performed using the name of the organ that has made the action, that is, using a word "mouth". In this way, the type and strength of feedback may freely be adjusted in accordance with the type of the target action or the degree of achievement. For example, even in a case in which the period of giving certain stimulation exceeds 1 sec, no problem arises in feedback if the stimulation starts almost at the same time (for example, within 1 sec) as the achievement of the target action. Furthermore, the feedback unit 217 preferably determines which body part has been moved by the user 220 to perform a target action and performs feedback that stimulates the tactile sense of the body part of the user 220, which has made the target action. That is, for example, if a rehabilitation action is performed by moving the right leg, feedback of, for example, applying a vibration to the right leg is preferably performed.

The display controller 212 can make the target object 242 appear at different positions (for example, positions of three stages) in the depth direction. The evaluator 214 gives different points (a high point to a far object, and a low point to a close object).

The updater 215 updates a target task in accordance with the integrated point. For example, the target task may be updated using a task achieving ratio (target achieving count/task count).

Figure 3:
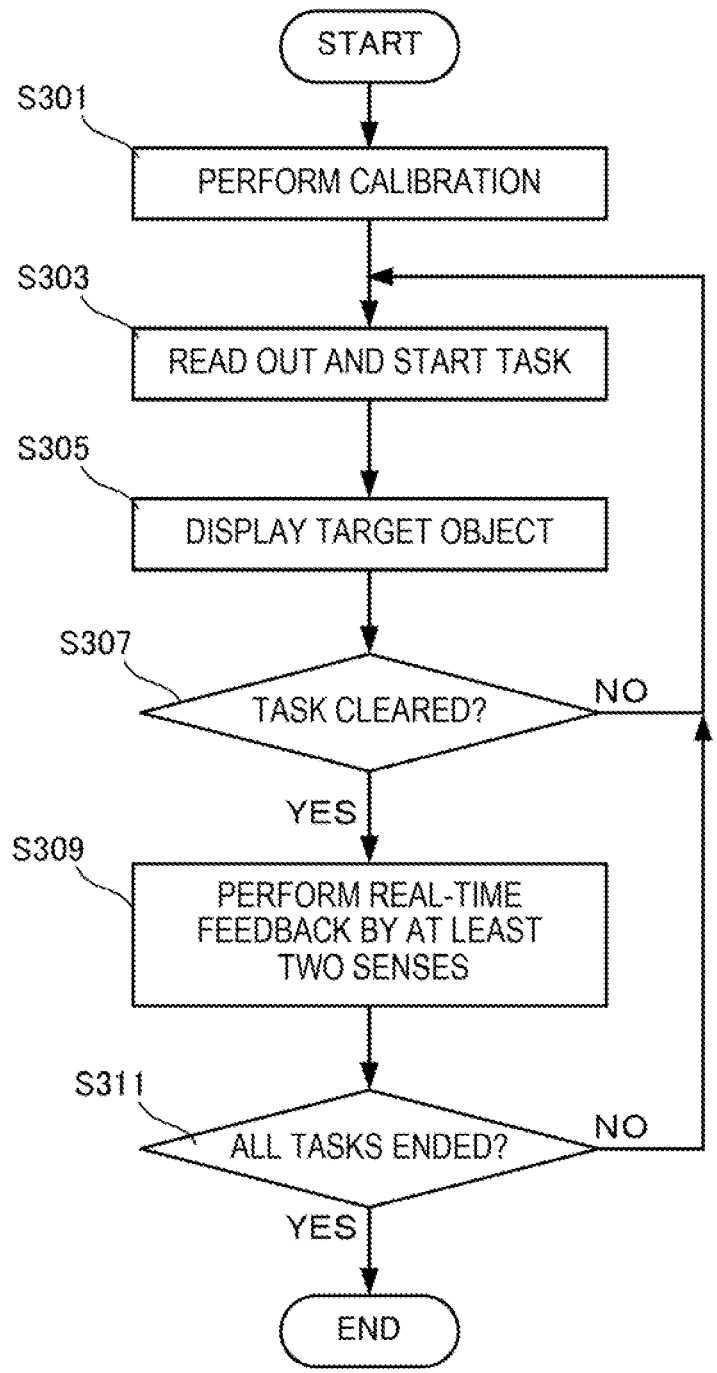
FIG. 3 is a flowchart showing the procedure of processing of the rehabilitation support apparatus according to the second example embodiment of the present invention.

FIG. 3 is a flowchart showing the procedure of processing of the rehabilitation support apparatus 210.

In step S301, as calibration processing, the target of a rehabilitation action is initialized in accordance with the user. More specifically, each patient is first made to do a work within an action enable range as calibration. It is set to the initial value, and the target is initialized in accordance with the user.

Next, in step S303, a task is started. More specifically, in addition to a method of designating each task in real time by an operator, a task set called a template may be read out from the task set database, and a task request (that is, display of a target object by the display controller 212) may be issued sequentially for a plurality of preset tasks.

In step S305, a target object according to the designated task is displayed.

In step S307, it is determined whether the task is achieved. If the task is achieved, the process advances to step S309, and real-time multi-channel feedback for stimulating at least two of five senses of the user is performed. In step S309, the preset type and strength of real-time multi-channel feedback are selected in accordance with the strength and type of each target action.

Furthermore, in step S311, it is determined whether all tasks have been ended. If not all tasks have been ended, the process returns to step S303 to start the next task. If all tasks have been ended, a cumulative point is calculated, and the processing is ended.

Case Examples

As findings based on case examples of intractable diseases such as cerebellar ataxia, intracerebral bleeding, cerebral palsy, paralysis after cerebral infarction, and progressive supranuclear palsy, if there was a level of mobility impairment that could not be recovered even by continuing conventional rehabilitation by a therapist (*that is, in a case in which only oral feedback with a delay was performed), in some cases, real-time feedback of single stimulation (only visual sense, only auditory sense, or the like) gradually improved mobility impairment in several weeks. However, there were many examples in which there was no improvement, and the degree of improvement was often minor.

However, there were many cases in which when real-time multi-channel feedback from two senses (visual sense and auditory sense, visual sense and tactile sense, or auditory sense and tactile sense) was performed for such a patient, intracerebral construction of a motion model progressed in several minutes, and it was confirmed that the mobility impairment dramatically improved. However, in this case as well, the storage period of the constructed motion model was short, and a function improvement maintaining period in one therapeutic intervention was about one week at the longest in many cases.

On the other hand, when real-time multi-channel feedback from three senses (visual sense, auditory sense, and tactile sense) was performed, intracerebral construction of a motion model could be achieved in several minutes, and the function improvement maintaining period in one therapeutic intervention was maintained more than one week in many cases. The storage fixing efficiency dramatically improved as compared to feedback from two sensory organs. These results were empirically confirmed by therapeutic interventions to a plurality of patients. In addition, along with intracerebral construction of the motion model, pain (including phantom limb pain) symptoms often suffered by a patient of mobility impairment called RSD (Reflex Sympathetic Gistrophy) were also improved. For example, in questionnaires using a Visual Analogue Scale that is a pain scale, results representing that, for example, VAS was improved from 5 to 0 by the treatments were obtained. A plurality of doctors, physical therapists, and occupational therapists confirmed that these treatment effects were considered as dramatic effects that could not be achieved by the conventional medicine.

As described above, according to this example embodiment, multiple feedback (real-time multi-channel feedback) is performed almost at the same time (for example, within 1 sec) as the achievement of a target action using two or more sensory organs, thereby reconstructing a motion model in the brain very efficiently and effectively improve mobility impairment. In addition, if the motion model is reconstructed in the brain of the user by the real-time multi-channel feedback, pain symptoms including phantom limb pain caused by a loss or gap in the intracerebral motion model are improved.

Other Example Embodiments

While the invention has been particularly shown and described with reference to example embodiments thereof, the invention is not limited to these example embodiments.

It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A rehabilitation support apparatus for supporting rehabilitation of a user with mobility impairment, comprising:
a processing unit, configured to:
detect a rehabilitation action of the user based on a change in a position of the user;
generate, in a three-dimensional virtual space, an avatar object that moves in accordance with the detected rehabilitation action, a target object representing a three-dimensional target rehabilitation action, and a separate visual recognition object that surrounds the target object to identify a position of the target object, wherein the visual recognition object is a circle and the target object is a circle, the visual recognition object having a larger radius than a radius of the target object, the target object located at a center of the visual recognition object;
request the target rehabilitation action displayed on a display screen in accordance with a task;
compare the detected rehabilitation action and a target position represented by the target object, and evaluate the rehabilitation capability of the user; and
perform feedback that stimulates at least two of five senses to the user who has achieved the target rehabilitation action in synchronism with evaluation of achievement of the target rehabilitation action of each time substantially at the same time as a timing of achieving the target rehabilitation action,
wherein the task includes information relating to a size, position, and speed of the target object, and a size of the avatar object.

2. The rehabilitation support apparatus according to claim 1, wherein the target rehabilitation action is an action of touching the target object in the three-dimensional virtual space.

3. The rehabilitation support apparatus according to claim 1, wherein the target rehabilitation action is an action of moving a part of a body along a locus in the three-dimensional virtual space.

4. The rehabilitation support apparatus according to claim 1, wherein the feedback is a feedback that stimulates at least a visual sense and an auditory sense.

5. The rehabilitation support apparatus according to claim 1, wherein the feedback is a feedback that stimulates at least a visual sense and a tactile sense.

6. The rehabilitation support apparatus according to claim 5, wherein the processing unit is further configured to determine which body part has been moved by the user to perform the target rehabilitation action, and perform the feedback that stimulates the tactile sense of the body part of the user, which has achieved the target rehabilitation action.

7. The rehabilitation support apparatus according to claim 1, wherein the feedback is a feedback that stimulates at least an auditory sense and a tactile sense.

8. The rehabilitation support apparatus according to claim 1, wherein the feedback is a feedback that stimulates at least a visual sense, an auditory sense, and a tactile sense.

9. The rehabilitation support apparatus according to claim 1, wherein the processing unit is further configured to change a difficulty of the target rehabilitation action by changing the size of the target object or the size of the avatar object such that a smaller size of the target object or a smaller size of the avatar object increases the difficulty of the target rehabilitation action and a larger size of the target object or a larger size of the avatar object decreases the difficulty of the target rehabilitation action.

10. The rehabilitation support apparatus according to claim 1, wherein the processing unit is further configured to perform feedback according to a type of the target rehabilitation action and a degree of achievement.

11. The rehabilitation support apparatus according to claim 1, wherein the processing unit is further configured to change a difficulty of the target rehabilitation action by changing a size of the visual recognition object such that a smaller size of the visual recognition object increases the difficulty of the target rehabilitation action and a larger size of the visual recognition object decreases the difficulty of the target rehabilitation action.

12. The rehabilitation support apparatus according to claim 1, wherein the target object is half the size of the visual recognition object.

13. A rehabilitation supporting method for use by a rehabilitation support system that comprises a processing unit, for supporting rehabilitation of a user with mobility impairment, comprising:
detecting a rehabilitation action of the user based on a change in a position of the user;
generating, in a three-dimensional virtual space, an avatar object that moves in accordance with the detected rehabilitation action, a target object representing a three-dimensional target rehabilitation action, and a separate visual recognition object that surrounds the target object to identify a position of the target object, wherein the visual recognition object is a circle and the target object is a circle, the visual recognition object having a larger radius than a radius of the target object;
requesting the target rehabilitation action displayed on a display screen in accordance with a task;
comparing the detected rehabilitation action and a target position represented by the target object, and evaluate the rehabilitation capability of the user; and
performing feedback that stimulates at least two of five senses to the user who has achieved the target rehabilitation action in synchronism with evaluation of achievement of the target rehabilitation action of each time substantially at the same time as a timing of achieving the target rehabilitation action,
wherein the task includes information relating to a size, position, and speed of the target object, and a size of the avatar object.

14. The rehabilitation support method according to claim 13, wherein the target rehabilitation action is an action of touching a target object in the three-dimensional virtual space.

15. The rehabilitation support method according to claim 13, wherein the feedback is a feedback that stimulates at least a visual sense and an auditory sense.

16. A non-transitory computer readable medium storing a rehabilitation support program for execution by a rehabilitation support system for supporting rehabilitation of a user with mobility impairment, wherein said rehabilitation support system comprises a processing unit, and said program comprises instructions for:
    detecting a rehabilitation action of the user based on a change in a position of the user;
    generating, in a three-dimensional virtual space, an avatar object that moves in accordance with the detected rehabilitation action, a target object representing a three-dimensional target rehabilitation action, and a separate visual recognition object that surrounds the target object to identify a position of the target object, wherein the visual recognition object is a circle and the target object is a circle, the visual recognition object having a larger radius than a radius of the target object;
    requesting the target rehabilitation action displayed on a display screen in accordance with a task;
    comparing the detected rehabilitation action and a target position represented by the target object, and evaluate the rehabilitation capability of the user; and
    performing feedback that stimulates at least two of five senses to the user who has achieved the target rehabilitation action in synchronism with evaluation of achievement of the target rehabilitation action of each time substantially at the same time as a timing of achieving the target rehabilitation action,
    wherein the task includes information relating to a size, position, and speed of the target object, and a size of the avatar object.

17. A rehabilitation support apparatus for supporting rehabilitation of a user with mobility impairment, comprising:
    a processing unit, configured to:
    detect a rehabilitation action of the user based on a change in a position of the user;
    generate, in a three-dimensional virtual space, an avatar object that moves in accordance with the detected rehabilitation action, a target object representing a three-dimensional target rehabilitation action, and a separate visual recognition object that surrounds the target object to identify a position of the target object;
    request the target rehabilitation action displayed on a display screen in accordance with a task set read out from a task set database that is configured to store a plurality of task sets;
    compare the detected rehabilitation action and a target position represented by the target object, and evaluate the rehabilitation capability of the user; and
    perform feedback that stimulates at least two of five senses to the user who has achieved the target rehabilitation action in synchronism with evaluation of achievement of the target rehabilitation action of each time substantially at the same time as a timing of achieving the target rehabilitation action,
    wherein the task set database is further configured to store, for each task of each task set, information relating to a size, position, and speed of the target object, and a size of the avatar object.

18. The rehabilitation support apparatus according to claim 17, wherein the task set database is further configured to store an order of the tasks in each task set for providing to the user the tasks in the task set in the stored order, as the target rehabilitation action.

19. The rehabilitation support apparatus according to claim 17, wherein the visual recognition object is a circle and the target object is a circle, the visual recognition object having a larger radius than a radius of the target object.

20. A rehabilitation support apparatus for supporting rehabilitation of a user with mobility impairment, comprising:
    a processing unit, configured to:
    detect a rehabilitation action of the user based on a change in a position of the user;
    generate, in a three-dimensional virtual space, an avatar object that moves in accordance with the detected rehabilitation action, a target object representing a three-dimensional target rehabilitation action, and a separate visual recognition object that surrounds the target object to identify a position of the target object;
    request the target rehabilitation action displayed on a display screen in accordance with a task;
    compare the detected rehabilitation action and a target position represented by the target object, and evaluate the rehabilitation capability of the user; and
    perform feedback that stimulates at least two of five senses to the user who has achieved the target rehabilitation action in synchronism with evaluation of achievement of the target rehabilitation action of each time substantially at the same time as a timing of achieving the target rehabilitation action,
    wherein the task includes information relating to a size of the target object and a size of the visual recognition object, and the processing unit is further configured to change the size of the target object and the size of the visual recognition object for the task.

* * * * *